United States Patent Office 2,896,356
Patented July 28, 1959

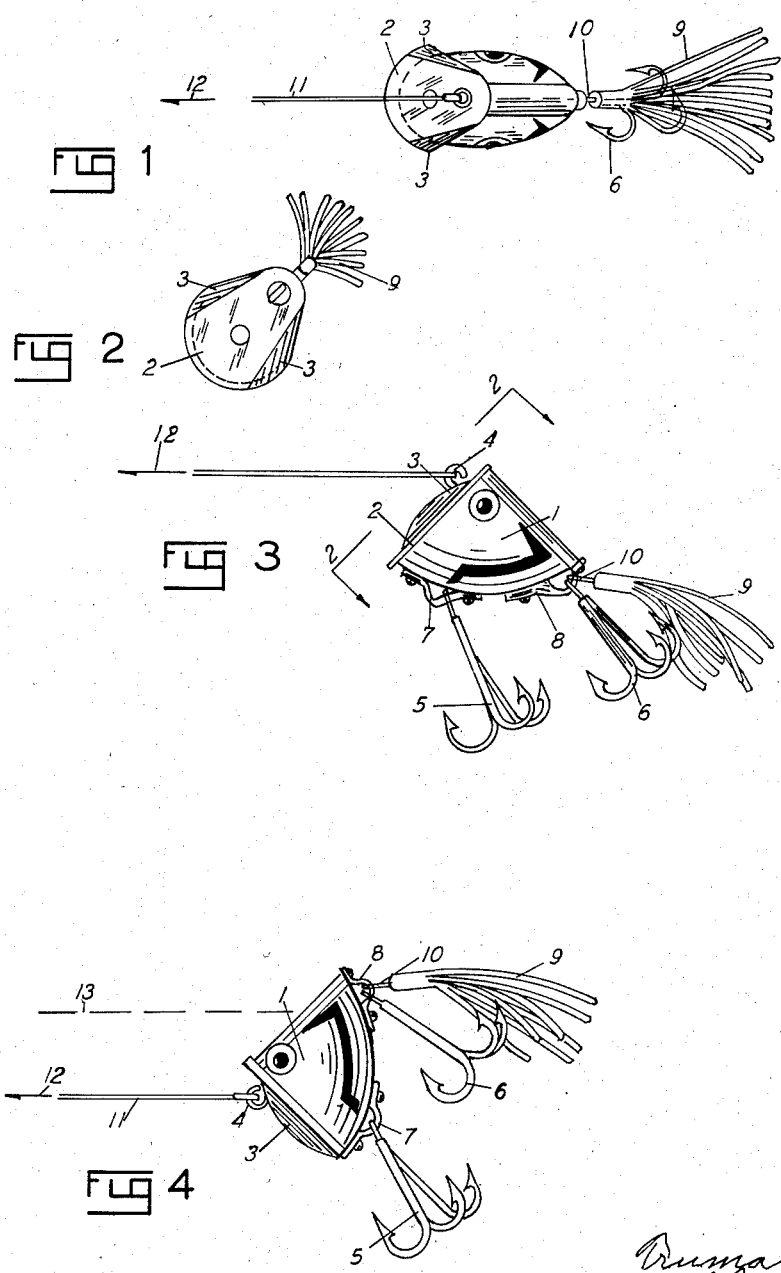

2,896,356

FISHING LURE

Truman B. Shaw, Montevallo, Ala.

Application July 22, 1957, Serial No. 673,262

1 Claim. (Cl. 43—42.28)

This invention relates to fishing lure. It has for its main objects to provide such a lure that will be highly satisfactory for the purpose intended, simple in structure, cheap to manufacture, easy to use and keep in working condition, and very durable.

A further object is to provide a fishing lure that will sink when placed in water, but will float along on the surface of water when pulled along on the end of a fishing line. In other words it will move along ski fashion when pulled continuously by a line.

Other objects and advantages will appear from the drawing and description.

By referring generally to the drawing it will be observed that Fig. 1 is a plan view of a fishing lure made according to this invention; Fig. 2 is a view on line 2—2 of Fig. 3; Fig. 3 is a side elevational view of the lure as it would appear in water when not being pulled along on the end of a fishing line; and Fig. 4 is a side elevational view of the lure as it would appear being pulled along on the surface of water.

Similar reference numerals refer to similar parts throughout the several views.

Referring to the drawing in detail it will be seen that the lure comprises a body 1 having attached to its front a metal plate 2 with its side edges 3 bent away from the body. An eye screw 4 is attached through the upper end portion of the plate and into the body. Fishing hooks 5 and 6 are attached swingably to the rounded back of the body at 7 and 8. A tail 9 made of flexible material is attached swingably to the body at 10. The end of a fishing line 11 is attached in the eye screw. When the lure is pulled along slowly in the direction indicated by the arrow 12 in Fig. 3 it will sink in the water; but when it is pulled fast in the direction indicated by the arrow 12 in Fig. 4 is will travel along on the surface of the water as the result of more water pressure on the lower portion of the bent plate than on its upper portion. The bent edges of the plate will maintain the lure in its upright position as it is pulled along on the surface of the water indicated by line 13.

The various parts of the lure may be made of any material suitable for the purpose, but I prefer to use the kinds of material generally used for fishing lures; also the parts may be made in different sizes and capacities, depending on how and where to be used.

While I have shown and described the preferred embodiment of my invention, I do not wish to limit same to the exact and precise details of structure, and reserve the right to make all modifications and changes so long as they remain within the scope of the invention and the following claim.

Having described my invention I claim:

A fishing lure of the character described comprising, a main body, said body having a front and a top flat surface which meet to form a substantial right angle and an arcuate shaped back portion which joins said front and top surfaces, said body being made of semi-hard material of a consistency to receive and hold screws, a metal plate attached to the front of the body so as to extend beyond the sides thereof, the side extensions of the plate being bent at approximately 90 degrees away from the body, an eye screw attached in the upper end portion of the plate and body, said eye screw being adapted for the end of a fishing line to be removably attached thereto, a plurality of fishing hooks swingably attached on the back rounded portion of the body, a cluster of similar strands of water proof flexible material attached swingably to the upper end of the back rounded portion of the body rearwardly of the fishing hooks, said metal plate on the front of the body being adapted to cause the lure to travel along on the surface of water when the lure is pulled along by a fishing line end attached in said eye screw.

References Cited in the file of this patent

UNITED STATES PATENTS

| | | |
|---|---|---|
| 1,352,054 | Dills | Sept. 7, 1920 |
| 1,832,172 | Winter | Nov. 17, 1931 |
| 2,183,849 | Swanberg | Dec. 19, 1939 |
| 2,449,700 | Hubbard | Sept. 21, 1948 |